(12) United States Patent
Husz

(10) Patent No.: US 6,277,427 B1
(45) Date of Patent: Aug. 21, 2001

(54) BEVERAGE, COMBINATION OF CONCENTRATES AND METHOD FOR PRODUCING A BEVERAGE

(76) Inventor: Georg Béla Husz, Karl Braungasse 18, Kottingbrunn, A-2542 (AT)

( * ) Notice: Subject to any disclaimer, the term of this patent is extended or adjusted under 35 U.S.C. 154(b) by 0 days.

(21) Appl. No.: 09/403,214

(22) PCT Filed: Apr. 15, 1998

(86) PCT No.: PCT/AT98/00095

§ 371 Date: Oct. 14, 1999

§ 102(e) Date: Oct. 14, 1999

(87) PCT Pub. No.: WO98/46092

PCT Pub. Date: Oct. 22, 1998

(30) Foreign Application Priority Data

Apr. 16, 1997 (AT) ........................................ 655/97

(51) Int. Cl.[7] .............. A23F 5/44; A23L 1/302; A23L 2/38; A23L 2/385

(52) U.S. Cl. .............. 426/590; 426/72; 426/73; 426/74; 426/590; 426/650

(58) Field of Search .............. 426/74, 590, 650, 426/72, 73

Primary Examiner—Helen Pratt

(74) Attorney, Agent, or Firm—Townsend and Townsend and Crew LLP

(57) ABSTRACT

The invention relates to a new beverage with a stimulating effect on the basis of caffeine, ascorbic acid, iron in ionic and/or complexed form, organic and inorganic food acids, mineral salts, sweeteners, auxiliary agents, vitamins and aromatic substances as well as water, which beverage contains the above-named substances preferably in a homogeneous mixture or solution characterized in that it contains at least one synergetically effective systemic combination of the three key components caffeine, ascorbic acid and iron—generating a lasting feeling of well-being in a person consuming the beverage—in which combination an additional, i.e. fourth key component is integrated, namely 3,5,5-trimethylhexanal, whereby the above-named four key components are present in the following concentrations in relation to 1 liter of beverage:

| | |
|---|---|
| Caffeine | 100 mg/l to 180 mg/l |
| Ascorbic acid | 200 mg/l to 350 mg/l |
| Iron | 5 mg/l to 10 mg/l |
| 3,5,5-trimethylhexanal | 0.5 μg/l to 1.5 μg/l. |

The invention also relates to a process for manufacturing the beverage and a concentrate suitable for that purpose.

15 Claims, No Drawings

BEVERAGE, COMBINATION OF CONCENTRATES AND METHOD FOR PRODUCING A BEVERAGE

The present invention relates to a new beverage which substantially belongs to the group of beverages with a stimulating effect, which are still increasingly popular today, especially with younger people and with those engaged in the work world.

The number of beverages offered in this segment of the beverage market, often at a rapid rate of change, is so great that it is difficult to obtain a systematic overview of the state of the art and future developments.

However, in principle, it can be assumed that the basis of these beverages, most of which are non-alcoholic, is formed by water, and that the substantial components they contain—alternatively or jointly and in varying quantities—consist of caffeine, mineral salts, food acids and aromatic substances, and sometimes ascorbic acid, the latter of which can often be the factor that determines the acceptance or non-acceptance of a beverage; often this is even determined by the consumer's sex, age and/or social group.

There is quite a large number of publications in which such stimulating beverages or beverage combinations are described, whose desired stimulating effect is due to caffeine, ascorbic acid and iron compounds and which may also contain a number of varying supplementary components individually or in many different combinations. These known supplementary components in beverages include vitamins, magnesium salts, calcium, sodium and/or potassium, sweeteners, organic and/or inorganic acids, fruit aroma compounds, and of course also carbonic acid, etc.

Thus, EP 397232 A1 describes beverages fortified with vitamins and minerals, which contain vitamin A in the form of b-carotene, vitamin C and riboflavin. These beverages contain increased quantities of calcium and iron, whereby the iron can be provided in the form of a sugar complex or as a gluconate-ascorbate complex, also as malate, citrate, ascorbate and/or tartrate. The beverages thus described, which are characterized by the high stability of the vitamins, also contain—individually or in various combinations—dextrin, gum arabic, sucrose, fructose, glucose, corn syrup, etc. The beverages also contain the juices of various native or exotic fruits as well as sugar alcohols, vitamins of the B group, sweeteners, caffeine and carbonated water. Their pH may be 2.5 to 5, for example.

EP 511587 A1 relates to a slimness-promoting "edible" composition which may be produced as a food or a beverage and is said to contribute to the breakdown of fat in the body. It contains at least one amino acid, its digestible salts, at least one xanthine derivative and at least one thiamine compound. The xanthine derivative can be caffeine, theophyline or theobromine. Other components of the formula disclosed therein for a beverage are metal salts, citric acid, citrates, vitamins of the B series, maltol, saccharine, aspartame and/or aromatic substances.

WO 91/12734 (PCT/US 91/12734) relates to beverage compositions or concentrates for human consumption which are water-based and contain physiologically important electrolytes, minerals, carbohydrates, sweeteners and food-acid components. The beverages described therein are said to promote in particular the compensation for liquid loss in the body, e.g. as the result of heat or athletic activity.

Some other components of these beverages are iron, sodium, potassium, calcium, magnesium, chloride, bicarbonate, phosphate, vitamin C, vitamin E, fructose, glucose, organic acids such as citric acid, and inorganic acids such as citric acid[1].

Translator's note: The German text lists citric acid as both an organic and an inorganic acid.

It was now found that the addition or the absence of a single, often completely inconspicuous component can decide how the effect of the beverage (whether it be favourable or unfavourable), the speed at which the effect itself is felt and/or the duration of the effect is subjectively perceived by individual consumers and, of course, eventually by a majority of consumers. Another factor—although in this particular beverage sector perhaps only of secondary importance—is the ability of the beverage to produce a thirst-quenching effect (although in some cases perhaps only subliminally) and to make it last.

The task of the invention was to create a beverage which after being consumed will maintain or moderately increase productivity in the broadest sense while generating in the consumer a feeling of general well-being which it is also able to sustain for some time.

In the course of development, a substance known per se was found which in extremely small concentration and in a carefully measured relationship with the other beverage components is able to provide a beverage with the effective characteristics globally specified above.

The object of the invention therefore is a new beverage, in particular a beverage with a stimulating effect, based on caffeine, ascorbic acid, iron in ionic and/or complexed form, organic and inorganic food acids, mineral salts, sweeteners, auxiliary agents, vitamins and aromatic substances as well as water, which beverage contains the above-named substance in a homogeneous mixture or solution characterized in that it contains at least one synergetically effective systemic combination of the three key components caffeine, ascorbic acid and iron—generating a lasting feeling of well-being in a person consuming the beverage—in which combination an additional, i.e. fourth key component is integrated, namely 3,5,5-trimethylhexanal, whereby the four key components are present in the following concentrations in relation to 1 liter of beverage:

| | |
|---|---|
| Caffeine | 100 mg/l to 180 mg/l |
| Ascorbic acid | 200 mg/l to 350 mg/l |
| Iron | 5 mg/l to 10 mg/l |
| 3,5,5-trimethylhexanal | 0.5 μg/l to 1.5 μg/l |

The specific combination which forms the effectiveness centre of the new beverage, namely caffeine, relatively small quantities of iron, ascorbic acid and 3,5,5-trimethylhexanal, which is approved as a food ingredient, if consumed in normal quantities, i.e. in quantities of about up to 1 liter per day, will cause a feeling of well-being while at the same time increasing in consumers their joy of activity and their attention span and improving their ability to concentrate, without the occurrence of the unpleasant side effects of caffeine, namely nervousness or disturbed sleep. As extensive experiments have shown, 3,5,5-trimethylhexanal in the beverage is consciously perceived by consumers only when they are first introduced to it in its pure form. Nevertheless, 3,5,5-trimethylhexanal is appreciated or perceived by the limbic system, i.e. the functionally connected groups of phylogenetically older regions in the nucleus and cerebral cortex of the brain. The limbic system is connected with emotions, vegetative reactions and memory functions and is not controlled rationally.

It was found in numerous trials that this desired basic effect was considerably increased by means of carefully measured doses of the co-components of caffeine and ascorbic acid. It was also found that the added iron was able to considerably prolong the duration of the effect.

In summary, it can be stated that while the substance which actually induces the effect and is largely responsible for it is 3,5,5-trimethylhexanal and while its positive effect with regard to a feeling of well-being did occur without interaction with caffeine, ascorbic acid and iron, this effect was considerably increased through the synergetic participation of the above-named substances, which also meant that the percentage of persons who did actually perceive and appreciate a positive effect on their well-being increased as well.

It was also found that the above-mentioned effect producing a feeling of well-being also depended to quite a large degree on the ratio of the individual key ingredients to each other. It was observed that when the concentration ranges of these key components exceeded or fell short of the stated limits, the effect was not increased and sometimes actually decreased to a noticeable degree.

Thus, an increase in the quantity of one or more individual components, for example, did not produce any further improvements. Thus, an increased amount of caffeine proved to be quite counter-productive.

It was found that the presence of salts of sodium, magnesium, calcium, potassium and iron, known per se, as well as the addition of zinc, did support the effect in terms of a feeling of well-being and stimulation. The presence of zinc should be particularly emphasized, since there is concern about the lack of zinc as a trace element in virtually all population groups.

The full development of the invigorating effect of the beverage, while maintaining the lasting effect of the productivity level increased by its consumption, can be reached when the key components and supplementary components listed individually in claim 2, in particular the salts, are present, whereby the anions selected with the salts play a specially important role for the effectiveness of the transport in the body and for the acceptance of the components. However, the effect of the quantitative mutual relationships of these salts should also not be neglected by any means. It was already mentioned above that the iron salts produce a synergetic effect in conjunction with the concentrations of caffeine and ascorbic acid.

Of course, consumers expect that a beverage tastes good, even when it is not a purely thirst-quenching drink, and it stands to reason that the expectations and wishes of younger consumers, including children, must be taken into account.

In this respect, the presence of the natural and naturidentical sweeteners mentioned in claim 3, and their additives in the quantities mentioned therein, are a special advantage for the new stimulating beverage.

To ensure a stimulating refreshing effect and to bring the pH value of the beverage into the desired range, it is particularly advantageous when the pH, in at least three of the approved food acids mentioned in claim 4, lies within the total concentration range named therein.

It is also advantageous to adjust the pH value of the new invigorating beverage within the limits named in claim 5 and to maintain it until the beverage is consumed.

As a kind of antagonist to the caffeine, which acts especially upon the nervous system, it is an advantage if the vitamins of the group named in claim 6 are introduced—in quantities mentioned therein—into the beverage according to the invention.

An important means of promoting consumer acceptance of the new beverage are the natural and/or naturidentical aromatic substances, mostly fruit aroma compounds according to claim 7 which are present in the beverage, also providing it with certain supplementary flavours in addition to the main flavour. With regard to the substances listed in claim 7, it should be noted that specified exact values concerning quality and relative quantity of the aromatic substances in the finished beverage are not possible. These parameters and parameter conditions sometimes vary quickly from one flavour variety to another, and such changes in consumer taste must be taken into account directly and flexibly.

It should be mentioned here that the 3,5,5-trimethylhexanal provided in the key composition together with the co-components caffeine, ascorbic acid and iron ions, which is the important substance that generates the unexpected feeling of well-being, is essentially an aromatic substance. Its own flavour, odour and/or aroma can be called "diffuse, dry and grass-like". In case of the quantities already mentioned, namely 0.5 to 1.5 mg per liter of beverage, this aromatic substance, which has little attraction when tasted as an individual substance, emphasizes the overall impression desired for the taste or odour in question in a surprisingly pleasant manner, but without being penetrant. However, what is even more important and a complete surprise, and what characterizes the present invention, is the spectacular effect of 3,5,5-trimethylhexanal which increases the feeling of well-being. Its characteristics are as follows: Empirical formula: $C_9H_{18}O$. Kp: 67–68°/25 mm; Fp: 116° F., d=0.817 g/cm$^3$; FEMA No. 3524.

An immediate refreshing effect of the new beverage can be achieved with carbonic acid concentrations in the range named in claim 8.

If the beverage is meant to be consumed by children, e.g. below 14 years of age, it is recommended that the caffeine content be lowered to the values shown in claim 9. Especially in children, it was observed that the beverage had the effect of increasing enthusiasm and the interest in work, even without caffeine.

A particularly positive effect on memory, which was achieved by the addition of gingko extract, as described in claim 10, can round off the new beverage's invigorating spectrum of effects in an advantageous manner.

In summary it can be stated that the new beverage, in its basic version as well as in the above-named preferred variations, has a stimulating effect, increasing the physical and mental productivity, the attention span and the ability to concentrate, but that it should by no means be designated as an "energy drink", etc. with an explosively quick or rousing effect. The new beverage is not only without the side effects, which are often subjectively perceived as unpleasant, such as nervousness, tingling, sleep disorders, but consumers are able to perceive the feeling of well-being it causes—consciously and without any side effects. Feelings of listlessness are suppressed. This pleasant effect lasts for a long time.

The addition of green-tea extract—see claim 11—can also have the effect of increasing the good taste as well as the stimulative effect. Such an addition can even have the advantage of a carcinostatic effect.

Another object of the invention is a process for manufacturing the new beverage whose substantial characteristics consist in that to a stream of water forming the basis for the beverage, a stream of a first partial concentrate with one or more sweeteners, auxiliary agents, aromatic substances, fruit aroma compounds and the fourth key component, 3,5,5-trimethylhexanal is added and admixed to the water in a turbulent stream, following which a second stream of a second partial concentrate, containing the three key components caffeine, ascorbic acid and iron compounds, as well as organic and inorganic food acids, salts and vitamins is added to the stream of the intensive mixture of water and the first partial stream, and is admixed in the same turbulent stream until complete homogenization of all components is achieved. The described separation of the concentrate into two batches is an advantage for the production process and leads to a beverage with extremely stable storage characteristics.

claim 13 describes the preferred ratio between the total amount of the partial concentrates and the amount of water in the new beverage.

Another object of the invention is a concentrate to be supplied to beverage manufacturers and bottlers; it forms the basis for the finished product, which is filled into bottles, cans, containers, etc. and sold to consumers.

As claim 14 indicates, this concentrate consists of two separate partial concentrates, one of which is first added to the water used for the beverage and homogeneously admixed. Subsequently, the other partial concentrate is added in diluted form to the first partial concentrate which is at least largely homogenized in water, and the final production of the beverage is then accomplished by means of intensive further mixing and complete homogenization of the components.

The separation of a concentrate into two batches is actually quite a conventional method and has the advantage that it prevents the absence of individual components in the finished product and the occurrence of inhomogeneous, undesirably cloudy portions, etc.

Especially preferred in connection with the invention are concentrates with the quantities described in claim 15 derived from the beverage versions described above.

EXAMPLE 100 liters of the new beverage were produced in a mixer with agitator, using the concentration quantities shown in Table 1.

TABLE 1

| Partial concentrate 1 | | Partial concentrate 2 | |
|---|---|---|---|
| | quantity per liter of beverage | | quantity per liter of beverage |
| Fruit aroma mixture*) (3 components) Basic version "tart" | 6.7 µl | Organic acid 1***) | 3.6 g |
| Dextrose | 22 g | Inorganic acid {phosphoric acid} | 0.5 g |
| Fructose | 28 g | Trisodium citrate | 1.5 g |
| Natingin (Bitter compound) | 29 mg | Magnesium chloride hexahydrate | 1.6 g |
| Pectin | 105 mg | Calcium chloride dihydrate | 1.2 g |
| Aspartame | 75 mg | Potassium dihydrogen phosphate | 350 mg |
| Aroma mixture**) (6 components) Basic taste: fruity Exotic | 512 µl | Sodium chloride | 220 mg |
| 3,5,5-trimethylhexanal | 1.3 µl | Iron(III)-oxide saccharate (Merck) (Fe)(8) | 82 mg |
| | | Zinc sulphate-heptahydrate | 33 mg |
| | | Caffeine | 160 mg |
| | | Ascorbic acid | 310 mg |
| | | Vitamin B5 | 1.9 mg |
| | | Vitamin B1 | 0.7 mg |
| | | Vitamin B2 | 0.8 mg |
| The sum of all above substances dissolved including water = 75 ml (homogenized under pressure) | | The sum of all above substances dissolved including water = 25 ml (homogenized at slightly raised temperature) | |

*all aromatic substances naturidentical (Grünewald)
**6 natural aromatic substances 1, naturidentical aromas (all from Firmenich)
***mixture: citric acid, tartaric acid, malic acid - about 1:1:1

The basis consisted of 97.5 liters of groundwater (of drinking water quality) with a total hardness of 12 dH. Of the homogenized partial concentrate 1, which had been carefully prepared with the same water, 1250 ml were added to the total volume of the water; then the mixture was stirred for 5 minutes.

Subsequently, partial concentrate 2 homogenized in the same manner from a second concentrate vessel was stirred-in within 3 min, and the entire resulting mixture was also stirred again for 5 min. The temperature of the finished product was 17° C. Under sterile conditions, the beverage was filled into 0.5-liter bottles which were provided with a crown cork cap. The bottles were stored at 11° C.

In an oriented small-scale trial, 22 persons aged between 17 and 50 (1 person was 63 years old) were given four 0.5-liter bottles each of the new beverage, whose composition is shown in Table 1. The condition was that they had to consume the respective half-liter portions within three days. After feeling an effect, the were to evaluate them individually and subjectively according to the following scale and then enter the results on a test control sheet:

0 felt no effect
1 felt an effect
2 felt a strong effect, and
−1 felt a negative effect.

The following categories of subjective perception were to be evaluated:
a "I feel better/more balanced after drinking"
b "I find working/learning easier after drinking"
c "I feel nervous/tense/restless after drinking"

The following Table 2 shows the test results. The figures indicate the number of test person with the same mark.

TABLE 2

| Dose | 1 | 2 | 3 | 4 |
|---|---|---|---|---|
| Effect, mark | −1, 0, 1, 2 | −1, 0, 1, 2 | −1, 0, 1, 2 | −1, 0, 1, 2 |
| Category | | Number of Persons | | |
| A | 2, 4, 12, 4 | 0, 5, 12, 3 | 2, 4, 9, 6 | 0, 3, 8, 12 |
| B | 0, 5, 10, 6 | 2, 4, 7, 9 | 0, 13, 10, 9 | 1, 4, 8, 9 |
| C | 4, 13, 4, 1 | 5, 15, 2, 0 | 6, 14, 1, 1 | 3, 18, 0, 1 |

Of course, this test series with such a small number of test persons cannot be of absolutely representative character, but only of informal character, but it certainly confirms that a large majority perceived the effect of the new beverage as positive, such as a feeling of heightened well-being and greater productivity.

As far as the duration of the new beverage's effect on subjectively felt well-being is concerned, the evaluation of a respective test question has shown that the average was over 1 hour.

What is claimed is:

1. Beverage with a stimulating effect on the basis of caffeine, ascorbic acid, iron in at least one of ionic and/complexed form, organic and inorganic food acids, mineral salts, sweeteners, auxiliary agents, vitamins and aromatic substances as well as water, which beverage contains the above-named substances in a homogeneous mixture or solution wherein the beverage contains a synergistically effective systemic combination of the three components caffeine, ascorbic acid and iron—generating a lasting feeling of well-being in a person consuming the beverage—in which combination an additional fourth key component is integrated, namely 3,5,5-trimethylhexanal, whereby the above-named four key components are present in the following concentrations in relation to 1 liter of beverage:

| | |
|---|---|
| Caffeine | 100 mg/l to 180 mg/l |
| Ascorbic acid | 200 mg/l to 350 mg/l |
| Iron | 5 mg/l to 10 mg/l |
| 3,5,5-trimethylhexanal | 0.5 µg/l to 1.5 µg/l. |

2. Beverage according to claim 1, in addition to the four key components named therein in the quantitative proportions named therein, the beverage contains as supplementary components the salts of a group of trisodium citrate, sodium chloride, magnesium chloride and calcium chloride, potassium dihydrogen phosphate, iron salt in the form of iron(II) oxide saccharate and zinc sulphate, whereby these salts, always related to 1 liter of beverage, are present in the following proportions:

| | Quantity per liter of beverage |
|---|---|
| Trisodium citrate | 1.0–2.0 g |
| Magnesium chloride hexahydrate | 1.0–2.0 g |
| Calcium chloride dihydrate | 0.5–1.5 g |
| Potassium dihydrogen phosphate | 100–450 mg |
| Sodium chloride | 100–400 mg |
| Iron(III)oxide saccharate (Merck) | 50ϕmg |
| Zinc sulphate heptahydrate | 20–40 mg. |

3. Beverage according to claim 1, with a stimulating effect on the basis of caffeine, ascorbic acid, iron in at least one of ionic and complexed form, organic and inorganic food acids, mineral salts, sweeteners, auxiliary agents, vitamins and aromatic substances as well as water, which beverage contains the above-named substances in a homogeneous mixture or solution, wherein the beverage contains at least one synergistically effective systemic combination of the three key components caffeine, ascorbic acid and iron— generating a lasting feeling of well-being in a person consuming the beverage—in which combination an additional, fourth key component is integrated, namely 3,5,5-trimethylhexanal, whereby the above-named four key components are present in the following concentrations in relation to 1 liter of beverage:

| | |
|---|---|
| Caffeine | 100 mg/l to 180 mg/l |
| Ascorbic acid | 200 mg/l to 350 mg/l |
| Iron | 5 mg/l to 10 mg/l |
| 3,5,5-trimethylhexanal | 0.5 µg/l to 1.5 µg/l, | wherein in addition to the above-named four key components in the above-named quantitative proportions, the beveraged contains as supplementary components the salts from the group consisting of trisodium citrate, sodium chloride, magnesium chloride and calcium chloride, potassium dihydrogen phosphate, iron salt in the form or iron(II)oxide saccharate and zinc sulphate, whereby these salts, always related to 1 liter of beverage, are present in the following proportions:

| | Quantity per liter of beverage |
|---|---|
| Trisodium citrate | 1.0–2.0 g |
| Magnesium chloride hexahydrate | 1.0–2.0 g |
| Calcium chloride dihydrate | 0.5–1.5 g |
| Potassium dihydrogen phosphate | 100–450 mg |
| Sodium chloride | 100–400 mg |
| Iron(III)oxide saccharate (Merck) | 50ϕmg |
| Zinc sulphate heptahydrate | 20–40 mg. | and wherein the beverage also contains a combination dextrose, fructose, saccharose, aspartame and pectin as sweeteners and auxiliary agents, whereby these substances are present in the following proportions, related to 1 liter of water:

| | Quantity per liter of beverage |
|---|---|
| Dextrose | 13–30 g |
| Fructose | 18–32 g |
| Pectin | 40–120 mg |
| Aspartame | 50–120 mg. |

4. Beverage according to claim 1, wherein contains at least one organic food acid, selected from the group consisting of citric acid, tartaric acid, malic acid and lactic acid, whereby these food acids are present at a total quantity in the range of 1.4 to 6 g per liter of beverage, and that it contains a quantity of between 0.4 and 0.9 g of phosphoric acid per liter of beverage.

5. Beverage according to claim 1, wherein its pH value lies in the range of 2.5 to 3.

6. Beverage according to one claim 1, wherein the beverage contains vitamins B1, B2 and B6, namely at a total quantity of between 1.5 to 5.0 mg per liter of beverage.

7. Beverage according to claim 1, wherein the beverage contains at least two natural or naturidentical aromatic substances or fruit aroma compounds at a total quantity of 400 to 1400 µl aroma concentrate per liter of beverage.

8. Beverage according to one of claims 1, where the beverage has a carbonic acid content of 5 to 7 g per liter of beverage.

9. Beverage according to one of claim 1, wherein the beverage is altered for consumption by children and thus contains caffeine at quantities of only 5 to 30 mg per liter of beverage.

10. Beverage according to claim 1, wherein in addition to the components named therein, it contains up to 0.05 to 0.15 ml of a gingko extract per liter of beverage, with a content of approximately 10 mg of gingkoflavon glycosides per ml.

11. Beverage according to claims 1, wherein in addition to the components named therein, it contains between 200 and 1000 mg, preferable 200 to 800 mg of green tea extract per liter of beverage.

12. A concentrate combination for the manufacture of a beverage with a stimulating effect on the basis of caffeine, ascorbic acid, iron in at least one of ionic and complexed form, organic and inorganic food acids, mineral salts, sweeteners, ausiliary agents, vitamins and aromatic substances as well as water, which beverage contains the above-named substances in a homogeneous mixture or solution wherein the beverage contains a synergistically effective systemic combination of the three key components caffeine, ascorbic acid and iron—generating a lasting feeling of well-being n a person consuming the beverage—in which combination an additional fourth key component is integrated, namely 3,5,5-trimethylhexanal, whereby the above-named four key components are present in the following concentrations in relation to 1 liter of beverage:

| | |
|---|---|
| Caffeine | 100 mg/l to 180 mg/l |
| Ascorbic acid | 200 mg/l to 350 mg/l |
| Iron | 5 mg/l to 10 mg/l |
| 3,5,5-trimethylhexanal | 0.5 µg/l to 1.5 µg/l, | with the components and their quantitative proportions named therein, wherein the concentrate combination comprises two partial concentrates to be combined with water as the basis for the beverage, the first partial concentrate contains sweeteners and auxiliary agents, along with substances, and a fourth key component, 3,5,5-trimethylhexanal, and whose second partial component contains the three components, caffeine, ascorbic acid and iron compounds, as well as organic and inorganic food acids, salts and vitamins.

13. Concentrate combination according to claim 12, wherein the first and second partial concentrates contain the respective components in quantities related to 1 liter of beverage, with the total volume of both partial concentrates being 100 ml for the preparation of 1 liter of the finished beverage.

14. A process for manufacturing a beverage with a stimulating effect on the basis of caffeine, ascorbic acid, iron in at least one of ionic and/complexed form, organic and inorganic food acids, mineral salts, sweeteners, auxiliary agents, vitamins and aromatic substances as well as water, which beverage contains the above-named substances in a homogeneous mixture or solution wherein the beverage contains a synergistically effective systemic combination of the three components caffeine, ascorbic acid and iron—generating a lasting feeling of well-being in a person consuming the beverage—in which combination an additional fourth key component is integrated, namely 3,5,5-trimethylhexanal, whereby the above-named four key components are present in the following concentrations in relation to 1 liter of beverage:

| | |
|---|---|
| Caffeine | 100 mg/l to 180 mg/l |
| Ascorbic acid | 200 mg/l to 350 mg/l |
| Iron | 5 mg/l to 10 mg/l |
| 3,5,5-trimethylhexanal | 0.5 µg/l to 1.5 µg/l, | the process comprising adding and admixing, to a stream of water forming the basis for the beverage, a stream of a first partial concentrate with one or more sweeteners, auxiliary agents, aromatic substances, fruit aroma compounds and the fourth key component, 3,5,5-trimethylhexanal to the water in a turbulent stream, adding and admixing, to the intensive mixture of water and the first partial stream, a second stream of a second partial concentrate containing the three key components caffeine, ascorbic acid and iron compounds, as well as organic and inorganic food acids, salt and vitamins in the same turbulent stream until complete homogenization of all components is achieved.

15. A process according to claim 14 wherein the first and second partial concentrates are added to the stream of water, which forms the basis for the beverage, in the following concentrations in relation to 1 liter of beverage:

| | |
|---|---|
| Caffeine | 100 mg/l to 180 mg/l |
| Ascorbic acid | 200 mg/l to 350 mg/l |
| Iron | 5 mg/l to 10 mg/l |
| 3,5,5-trimethylhexanal | 0.5 µg/l to 1.5 µg/l, | at a total volume of 100 ml of first and second partial concentrate per liter of finished product.

\* \* \* \* \*